United States Patent
Shi et al.

(10) Patent No.: US 12,266,491 B2
(45) Date of Patent: Apr. 1, 2025

(54) SWITCHING APPLIANCE

(71) Applicant: NOARK ELECTRICS(SHANGHAI) CO. LTD., Shanghai (CN)

(72) Inventors: Xiaoyan Shi, Shanghai (CN); Haiyuan Wang, Shanghai (CN)

(73) Assignee: NOARK ELECTRICS(SHANGHAI) CO., LTD. (CN)

( * ) Notice: Subject to any disclaimer, the term of this patent is extended or adjusted under 35 U.S.C. 154(b) by 417 days.

(21) Appl. No.: 17/800,722

(22) PCT Filed: Feb. 18, 2021

(86) PCT No.: PCT/CN2021/076694
§ 371 (c)(1),
(2) Date: Aug. 18, 2022

(87) PCT Pub. No.: WO2021/164698
PCT Pub. Date: Aug. 26, 2021

(65) Prior Publication Data
US 2023/0082735 A1    Mar. 16, 2023

(30) Foreign Application Priority Data
Feb. 19, 2020  (CN) .......................... 202020183043.9

(51) Int. Cl.
*H01H 50/04* (2006.01)
*H01H 50/54* (2006.01)
*H01H 50/56* (2006.01)

(52) U.S. Cl.
CPC ........ *H01H 50/045* (2013.01); *H01H 50/541* (2013.01); *H01H 50/56* (2013.01)

(58) Field of Classification Search
CPC .... H01H 50/045; H01H 50/541; H01H 50/56; H01H 50/545; H01H 50/546
See application file for complete search history.

(56) References Cited

U.S. PATENT DOCUMENTS

| 4,345,225 A | * | 8/1982 | Lemmer | ................ H01H 50/14 335/132 |
| 4,774,484 A | * | 9/1988 | Lehman | ............... H01H 50/545 335/197 |

(Continued)

FOREIGN PATENT DOCUMENTS

| CN | 105679610 A | 6/2016 |
| CN | 105977101 A | 9/2016 |

(Continued)

OTHER PUBLICATIONS

International Search Report mailed May 24, 2021 in corresponding PCT International Application No. PCT/CN2021/076694.

*Primary Examiner* — Bernard Rojas
(74) *Attorney, Agent, or Firm* — OSTROLENK FABER LLP

(57) ABSTRACT

A switching appliance that includes a first housing and a second housing on one side of the first housing to accommodate an auxiliary contact mechanism, the first housing having a lower housing, and an upper housing to accommodate a main contact mechanism; the auxiliary contact mechanism having a linkage member connected to the main contact mechanism; a mounting leg that extends to the side surface of the side wall of the lower housing is arranged at the bottom of the second housing; a first clamping groove in the side surface, facing the lower housing, of the mounting leg, and a second clamping groove opposite the first clamping groove formed in the side wall of the lower housing; the mounting leg is connected to the side wall of the lower housing through a connector, which fixes the second housing and the first housing.

10 Claims, 7 Drawing Sheets

(56) References Cited

U.S. PATENT DOCUMENTS

| | | | | |
|---|---|---|---|---|
| 5,907,267 A | * | 5/1999 | Reid | H01H 50/08 340/638 |
| 2003/0057077 A1 | * | 3/2003 | Passow | H01H 50/541 200/307 |
| 2003/0057078 A1 | * | 3/2003 | Passow | H01H 50/541 200/330 |
| 2007/0188279 A1 | * | 8/2007 | Kim | H01H 50/541 335/202 |

FOREIGN PATENT DOCUMENTS

| | | |
|---|---|---|
| CN | 207947243 U | 10/2018 |
| CN | 212182226 U | 12/2020 |
| DE | 2124295 A1 | 11/1972 |
| GB | 1363991 A | 8/1974 |

* cited by examiner

SWITCHING APPLIANCE

CROSS-REFERENCE TO RELATED APPLICATIONS

The present application is a 35 U.S.C. §§ 371 national stage application of International Application No. PCT/CN2021/076694, filed Feb. 18, 2021, which claims priority to Chinese Patent Application No. CN202020183043.9, filed Feb. 19, 2020, the contents of both of which are incorporated herein by reference.

TECHNICAL FIELD

The present invention relates to the field of low-voltage electrical appliances, and more particularly, to a switching appliance.

BACKGROUND ART

A switching appliance such as a small contactor or a relay generally includes a main contact and an auxiliary contact, wherein the main contact is connected to a circuit and used to control the on-off of the circuit, the auxiliary contact is in linkage with the main contact, and the main contact can drive the auxiliary contact to actuate together while in operation. However, the existing auxiliary contact is usually installed on the top side of the switching appliance, such that the switching appliance is excessively high, making it difficult to install in a switch cabinet with insufficient height.

SUMMARY OF THE INVENTION

An objective of the present invention is to overcome the defects of the prior art and provide a switching appliance with a simple structure and high reliability.

To achieve the above object, the present invention adopts the following technical solution:

A switching appliance, comprising a first housing and a second housing installed on one side of the first housing and used to accommodate an auxiliary contact mechanism, wherein the first housing comprises a lower housing, and an upper housing disposed on the top side of the lower housing and used to accommodate a main contact mechanism; the auxiliary contact mechanism comprises a linkage member connected to the main contact mechanism; the side wall of the second housing is provided with a first through hole used to make way for the linkage member; the side wall of the upper housing close to the second housing is provided with a second through hole corresponding to the main contact mechanism inside the upper housing; a mounting leg that extends to the side surface of the side wall of the lower housing is arranged at the bottom of the second housing; a first clamping groove is formed in the side surface, facing the lower housing, of the mounting leg, and a second clamping groove which is opposite to the first clamping groove are formed in the side wall of the lower housing; the mounting leg is connected to the side wall of the lower housing through a connector; the first clamping groove and the second clamping groove are in position-limiting cooperation with two sides of the connector, respectively; and the connector is simultaneously inserted into the first clamping groove and the second clamping groove in a direction perpendicular to the linkage member to fix the second housing and the first housing.

Preferably, a positioning boss is arranged on the side wall outside the second housing; a positioning groove that cooperates with the positioning boss is formed in the side wall outside the first housing; and when the linkage member is inserted into the second through hole, the positioning boss is inserted into the positioning groove and then limited in position.

Preferably, the connector is strip-shaped, and has a "concave shape (a Chinese character "凹")" or H-shaped section.

Preferably, in the case that the connector is in a shaped of a Chinese character "凹", two limiting bars which are spaced from each other are arranged on the side surface of the connector; a limiting groove is formed between the two limiting bars; inner diameters of openings in the tops of the first clamping groove and the second clamping groove are respectively smaller than inner diameters of their respective bottoms; the first clamping groove and the second clamping groove are respectively communicated with the lower housing and the bottom of the mounting leg; when the connector is inserted into the first clamping groove and the second clamping groove from the bottom of the switching appliance, the two limiting bars slide along the bottoms of the first clamping groove and the second clamping groove respectively; and the openings in the top of the first clamping groove and the second clamping groove are respectively in position-limiting cooperation with the limiting groove.

Preferably, each of the two limiting bars has a triangular cross-section; the two limiting bars are, on their one sides close to each other, provided with first pushing surfaces inclined to the bottom surface of the limiting groove respectively; the inner diameters of the first clamping groove and the second clamping groove gradually shrink from the bottom to the top opening respectively, such that the side walls of the first clamping groove and the second clamping groove form second pushing surfaces that are opposite to the first pushing surfaces.

Preferably, a distance from the bottom of the limiting groove to the other side surface of the connector is smaller than the inner diameter of each of the top openings of the first clamping groove and the second clamping groove; a locking boss is arranged in the limiting groove; and the locking boss is in interference fit with the top openings of the first clamping groove and the second clamping groove respectively.

Preferably, a distance from the bottom of the limiting groove to the other side surface of the connector is smaller than the inner diameter of each of the top openings of the first clamping groove and the second clamping groove; a buckling structure is respectively arranged on the two limiting bars; and clamping grooves that cooperate with the two buckling structures are respectively formed in the inner wall of the first clamping groove and the inner wall of the second clamping groove.

Preferably, the second housing comprises a base in a semi-box shape, and the base is open toward one side of the first housing; a cover plate is arranged at an opening of the base; the cover plate is provided with a first through hole and a positioning boss; the auxiliary contact mechanism is installed in the base; a connecting column is arranged in the base in a width direction; and the cover plate is fixedly connected to the connecting column.

Preferably, the mounting leg is arranged on one end of the bottom side wall of the base close to the first housing; two supporting legs which are respectively connected to the bottom side wall of the base to form a triangle are arranged on both sides of one end of the mounting leg away from the first housing; two parallel mounting legs are arranged outside the bottom side wall of the base; the side wall of the lower housing is provided with two second clamping grooves which are respectively arranged opposite to the first clamping grooves in the two mounting legs; and the two mounting legs are respectively connected to the corresponding second clamping grooves through the connector.

Preferably, the auxiliary contact mechanism comprises a movable contact support, a movable contact bridge installed on the contact support, and two contact plates respectively arranged on both sides of the contact support; one ends of the two contact plates are respectively opposite to two ends of the movable contact bridge, and the other ends of the two contact plates are respectively provided with a wiring mechanism used to fix a wire; one side of the movable contact bridge away from each contact plate is connected to the contact support through an overtravel spring; one end of the contact support is connected to the second housing through a return spring; the side surface of the contact support is connected to the linkage member; and the linkage member 310 is inserted into the first housing 100 in a width direction and then connected to the main contact mechanism, so that the first clamping groove 211 is aligned with the second clamping groove 111.

According to the switching appliance provided by the present invention, when the second housing used to accommodate the auxiliary contact mechanism is assembled, the linkage member is inserted into the second through hole in a width direction and connected to the main contact mechanism, so that the first clamping groove 211 can be aligned with the second clamping groove 111. The connector is then inserted into the first clamping groove and the second clamping groove in a direction perpendicular to the linkage member at the same time and limited in position. The assembling directions of the linkage member and the connector are set to perpendicular to each other, without any interference during assembly. Therefore, the switching appliance has the characteristics of convenience in assembly and simple structure.

DETAILED DESCRIPTION OF THE PREFERRED EMBODIMENTS

Figure 1:
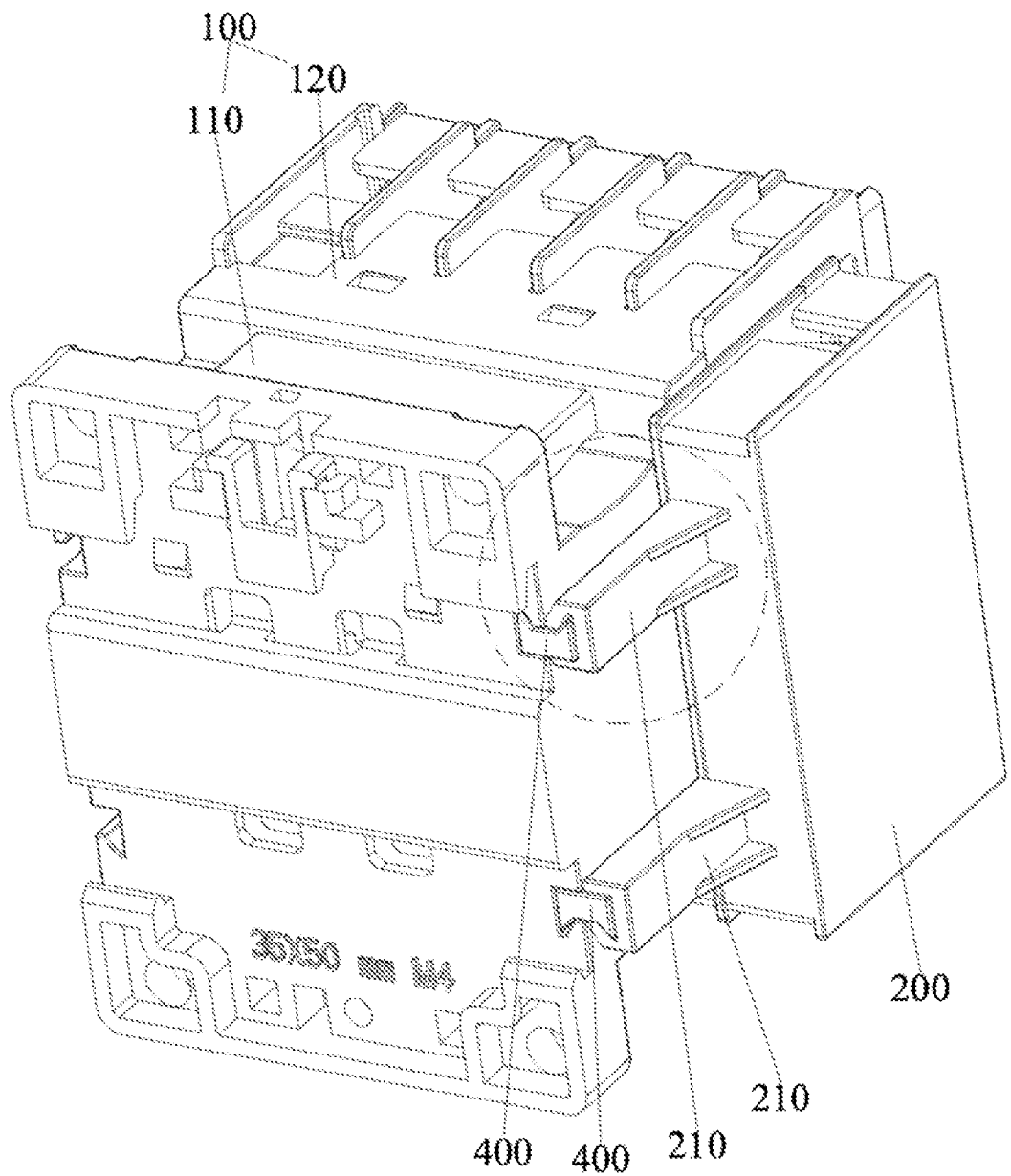
FIG. 1 is a schematic structural diagram of a switching appliance according to an embodiment of the present invention.

The specific implementation of a switching appliance provided by the present invention will be further described below with reference to the embodiments given in FIGS. 1 to 9. The switching appliance provided by the present invention is not limited to the description of the following embodiments.

As shown in FIGS. 1 to 5, a switching appliance provided by the present invention comprises a first housing 100 and a second housing 200 installed on one side of the first housing 100 and used to accommodate an auxiliary contact mechanism, wherein the first housing 100 comprises a lower housing 110 used to accommodate an electromagnetic system, and an upper housing 120 disposed on the top side of the lower housing 110 and used to accommodate a main contact mechanism; the second housing 200 is correspondingly arranged on one side of the upper housing 120; the auxiliary contact mechanism comprises a linkage member 310 connected to the main contact mechanism, and the linkage member 310 is parallel to a width direction of the second housing 200; the side wall of the second housing 200 is provided with a first through hole 311 used to make way for the linkage member 310; the side wall of the upper housing 120 close to the second housing 200 is provided with a second through hole 121 corresponding to the main contact mechanism inside the upper housing; a mounting leg 210 that extends to the side surface of the side wall of the lower housing 110 is arranged at the bottom of the second housing 200, that is, the connector 400 is arranged perpendicularly to the linkage member 310; a first clamping groove 211 is formed in the side surface, facing the lower housing 110, of the mounting leg 210, and a second clamping groove 111 which is opposite to the first clamping groove 211 is formed in the side wall of the lower housing 110; the mounting leg 210 is connected to the side wall of the lower housing 110 through the connector 400 arranged parallel to a height direction; the first clamping groove 211 and the second clamping groove 111 are in position-limiting cooperation with two sides of the connector 400, respectively; the linkage member 310 is inserted into the second through hole 121 of the first housing 100 in a width direction and then connected to the main contact mechanism, such that the first clamping groove 211 is aligned with the second clamping groove 111; and the connector 400 is simultaneously inserted into the first clamping groove 211 and the second clamping groove 111 in a direction perpendicular to the linkage member 310 to fix the second housing 200 and the first housing 100.

According to the switching appliance provided by the present invention, when the second housing 200 used to accommodate the auxiliary contact mechanism is assembled, the linkage member 310 is inserted into the second through hole 121 in a width direction and connected to the main contact mechanism. The connector 400 is then inserted into the first clamping groove 211 and the second clamping groove 111 in a direction perpendicular to the linkage member 310 at the same time and then limited in position. The assembling directions of the linkage member 310 and the connector 400 are set to perpendicular to each other, without any interference during assembly. Therefore, the switching appliance has the characteristics of convenience in assembly and simple structure.

Further, a positioning boss 220 is arranged on the side wall outside the second housing 200; a positioning groove 130 that cooperates with the positioning boss 220 is formed in the side wall outside the first housing 100; and when the linkage member 310 is inserted into the second through hole 121, the positioning boss 220 is inserted into the positioning groove 130 and then limited in position. The second housing 200 is prevented from moving when the connector 400 is inserted into the first clamping groove 211 and the second clamping groove 111, which can further reduce the difficulty in assembly and also play a limiting role between the second housing 200 and the first housing 100.

Figure 2:
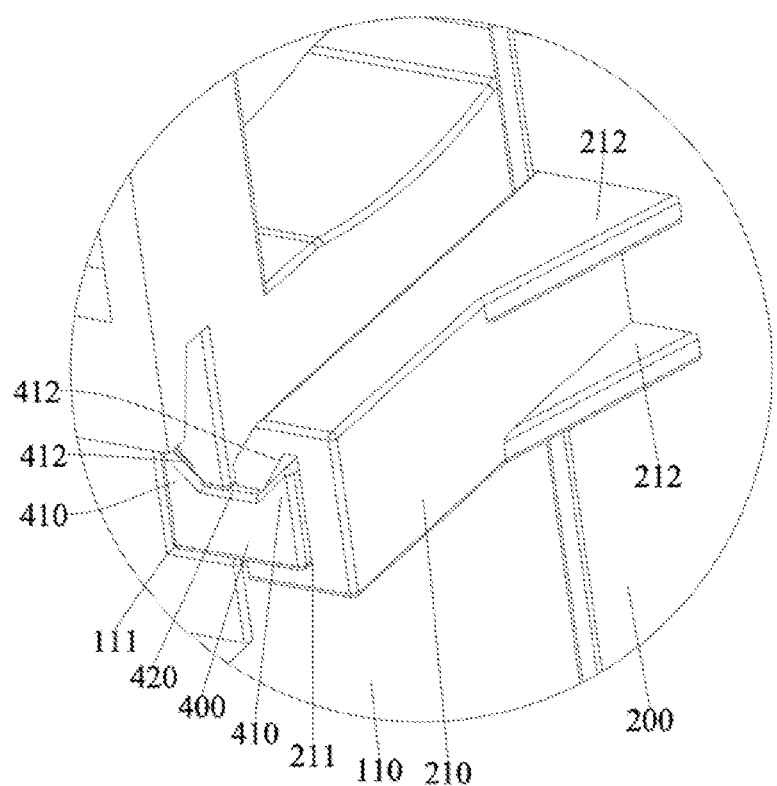
FIG. 2 is a partially enlarged view of FIG. 1 according to an embodiment of the present invention.
Figure 3:
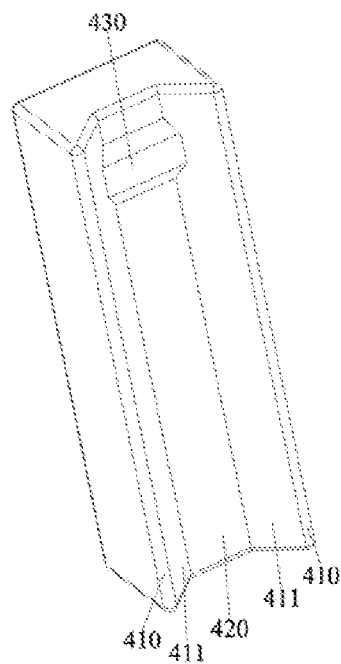
FIG. 3 is a schematic structural diagram of a connector according to an embodiment of the present invention.
Figure 4:
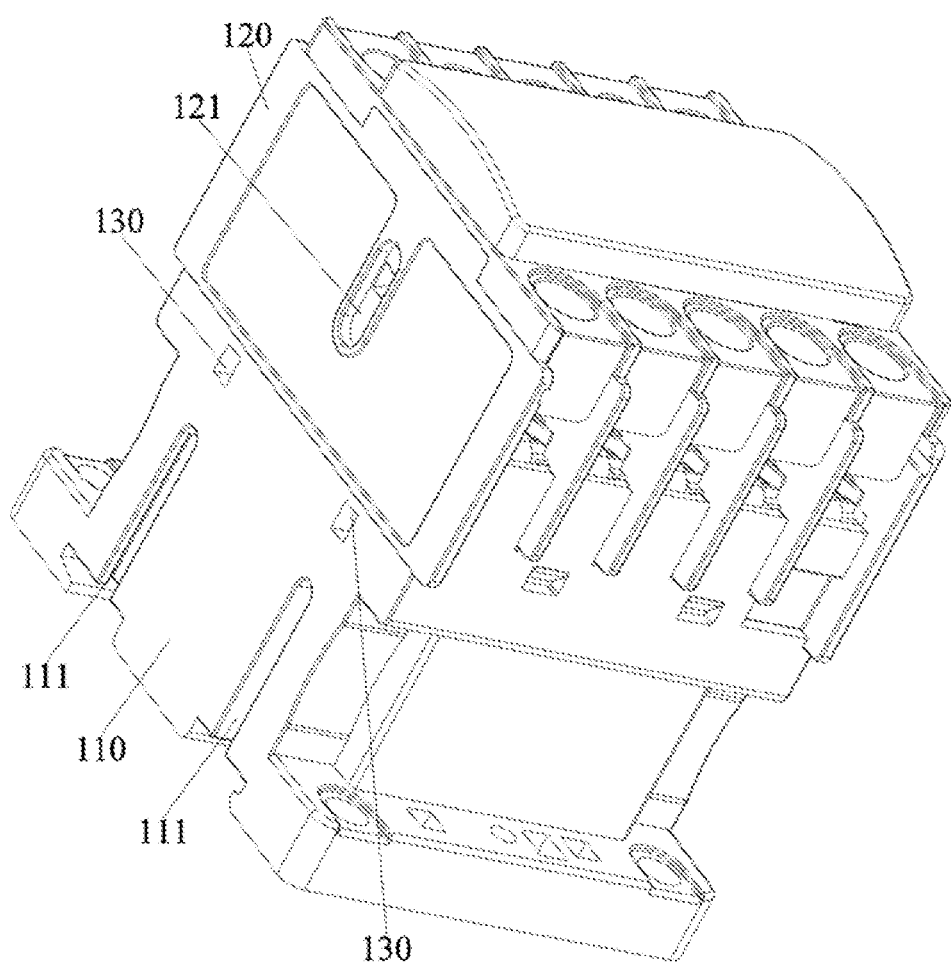
FIG. 4 is a schematic structural diagram of a first housing according to an embodiment of the present invention.
Figure 5:
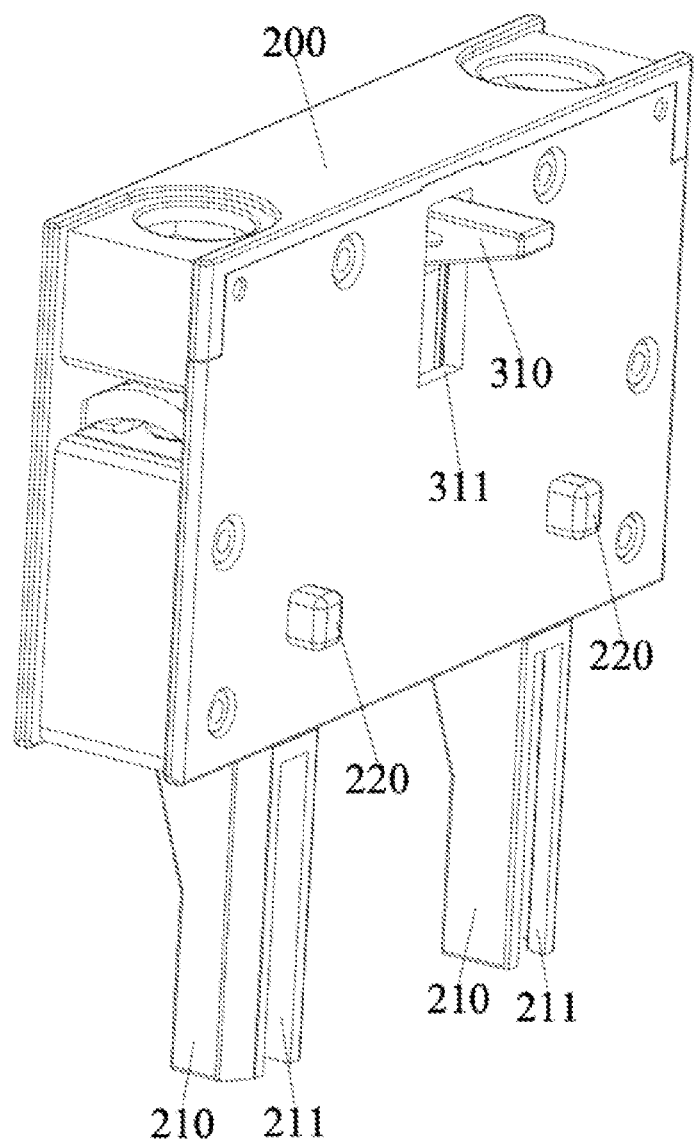
FIG. 5 is a schematic structural diagram of a second housing according to an embodiment of the present invention.

According to a preferred embodiment of the connector 400 shown in FIGS. 2 to 3, the switching appliance provided by the present invention is a contactor. The contactor comprises a first housing 100 and a second housing 200 installed on one side of the first housing 100 and used to accommodate an auxiliary contact mechanism, wherein the first housing 100 comprises a lower housing 110 used to accommodate an electromagnetic system, and an upper housing 120 disposed on the top side of the lower housing 110 and used to accommodate a main contact mechanism; the second housing 200 is correspondingly arranged on one side of the upper housing 120; a mounting leg 210 that extends to the side surface of the side wall of the lower housing 110 is arranged at the bottom of the second housing 200; a first clamping groove 211 is formed in the side surface, facing the lower housing 110, of the mounting leg 210, and a second clamping groove 111 which is opposite to the first clamping groove 211 is formed in the side wall of the lower housing 110; and the mounting leg 210 is connected to the side wall of the lower housing 110 through the connector 400.

The connector 400 in this embodiment is strip-shaped, and has a "concaveshape (a Chinese character "凹")" section, two limiting bars 410 which are spaced from each other are arranged on the side surface of the connector 400; a limiting groove 420 is formed between the two limiting bars 410; inner diameters of openings in the tops of the first clamping groove 211 and the second clamping groove 111 are respectively smaller than inner diameters of their respective bottoms; the first clamping groove 211 and the second clamping groove 111 are respectively communicated with the lower housing 110 and the bottom of the mounting leg 210; when the connector 400 is inserted into the first clamping groove 211 and the second clamping groove 111 from the bottom of the switching appliance, the two limiting bars 410 slide along the bottoms of the first clamping groove 211 and the second clamping groove 111 respectively; and the openings in the top of the first clamping groove 211 and the second clamping groove 111 are respectively in position-limiting cooperation with the limiting groove 420. Of course, two limiting bars 410 may be respectively arranged on two side surfaces of the connector 400, that is, the connector 400 may also have an H-shaped section. In addition, the connector 400 may also have other polygonal structures, which all fall within the protection scope of the present invention.

Further, each of the two limiting bars 410 has a triangular cross-section; the two limiting bars 410 are, on their one sides close to each other, provided with first pushing surfaces 411 inclined to the bottom surface of the limiting groove 420 respectively; the inner diameters of the first clamping groove 211 and the second clamping groove 111 gradually shrink from the bottom to the top opening respectively, such that the side walls of the first clamping groove 211 and the second clamping groove 111 form second pushing surfaces 412 that are opposite to the first pushing surfaces 411.

Through the cooperation of an inclined first pushing surface 411 and a second pushing surface 412 opposite to the first pushing surface 411, the two limiting bars 410 of the connector 400 can not only drive the mounting leg 210 and the lower housing 110 to approach each other, but also prevent the mounting leg 410 from moving laterally. Therefore, the second housing 200 is more reliably installed and fixed on the first housing 100. Of course, each limiting bar 410 may also have a transverse section of a trapezoid shape or other polygonal shape as long as the inclined first pushing surface 411 is provided.

Further, the thickness of the bottom of the limiting groove 420, i.e., a distance from the bottom of the limiting groove 420 to the other side surface of the connector 400 is smaller than an inner diameter of each of the top openings of the first clamping groove 211 and the second clamping groove 111; a locking boss 430 is arranged in the limiting groove 420; and the locking boss 430 is in interference fit with the top openings of the first clamping groove 211 and the second clamping groove 111 respectively.

Only one locking boss 430 needs to be arranged on the limiting groove 420 and can be in limited interference fit with the lower housing 110 and the mounting leg 210 at the same time, thereby achieving a simple structure and low cost. In addition, in the process of inserting the connector 400, it is possible to avoid an excessive friction at the top openings of the first clamping groove 211 and the second clamping groove 111 at the bottom of the limiting groove 420, thereby avoiding the problem that the connector 400 is difficult to insert. Of course, the locking boss 430 may not be provided, i.e., the bottom of the limiting groove 420 may be directly in interference fit with the top openings of the first clamping groove 211 and the second clamping groove 111 respectively, which all fall within the protection scope of the present invention.

As another embodiment of the connector 400, a buckling structure (not shown) may also be arranged on the connector 400, so that after the connector 400 is inserted in place, it is respectively fixed to the first clamping groove 211 and the second clamping groove 111 through the buckling structure. Specifically, a distance from the bottom of the limiting groove 420 to the other side surface of the connector 400 is smaller than the inner diameter of each of the top openings of the first clamping groove 211 and the second clamping groove 111; a buckling structure is respectively arranged on the two limiting bars 410; and clamping grooves that cooperate with the two buckling structures are respectively formed in the inner wall of the first clamping groove 211 and the inner wall of the second clamping groove 111, after the connector 400 is inserted in place, the two buckling structures are respectively buckled into the first clamping groove 211 and the second clamping groove 111, which all fall within the protection scope of the present invention.

Referring to Embodiment 1 of the auxiliary contact mechanism shown in FIGS. 5-8, the switching appliance in this embodiment is a small contactor, and the auxiliary contact mechanism is a normally-opened contact point structure. The auxiliary contact mechanism comprises a movable contact support 320, a movable contact bridge 330 installed on the contact support 320, and two contact plates respectively arranged on both sides of the contact support 320. In this embodiment, the contact plates are normally-opened contact plates 340, wherein one ends of the two contact plates are respectively opposite to two ends of the movable contact bridge 330, and the other ends of the two contact plates are respectively provided with a wiring mechanism 350 used to fix a wire; one side of the movable contact bridge 330 away from each contact plate is connected to the contact support 320 through an overtravel spring 370; one end of the contact support 320 is connected to the second housing 200 through a return spring 360; the side surface of the contact support 320 is connected to the linkage member 310; and the wiring mechanism 350 comprises a wiring screw and a wire pressing plate, wherein the wiring screw is screwed to push the wire pressing plate to press the wire on the contact plate.

When the main contact mechanism actuates, the contact support 320 is driven by the linkage member 310 to move, so that the contact support 320 drives two ends of the movable contact bridge 330 to contact or be separated from the two contact plates, respectively. After the main contact mechanism actuates, the contact support 320 is driven by the return spring 360 to drive the movable contact bridge 330 to reset. When both ends of the movable contact bridge 330 are respectively in contact with the two contact plates, a passage is formed between the two contact plates.

Since the auxiliary contact mechanism in this embodiment is a normally-opened contact point structure, the return spring 360 drives the movable contact bridge 330 to be away from the two contact plates, such that the movable contact bridge 330 is separated from the two contact plates in a normal state. When the main contact mechanism actuates, two ends of the movable contact bridge 330 are driven by the linkage member 310 to contact the two contact plates respectively. A working principle of the main contact mechanism is similar to that of the auxiliary contact mechanism, but the main contact mechanism moves such that the movable contact bridge of the main contact mechanism is driven by the electromagnetic system.

Figure 9:
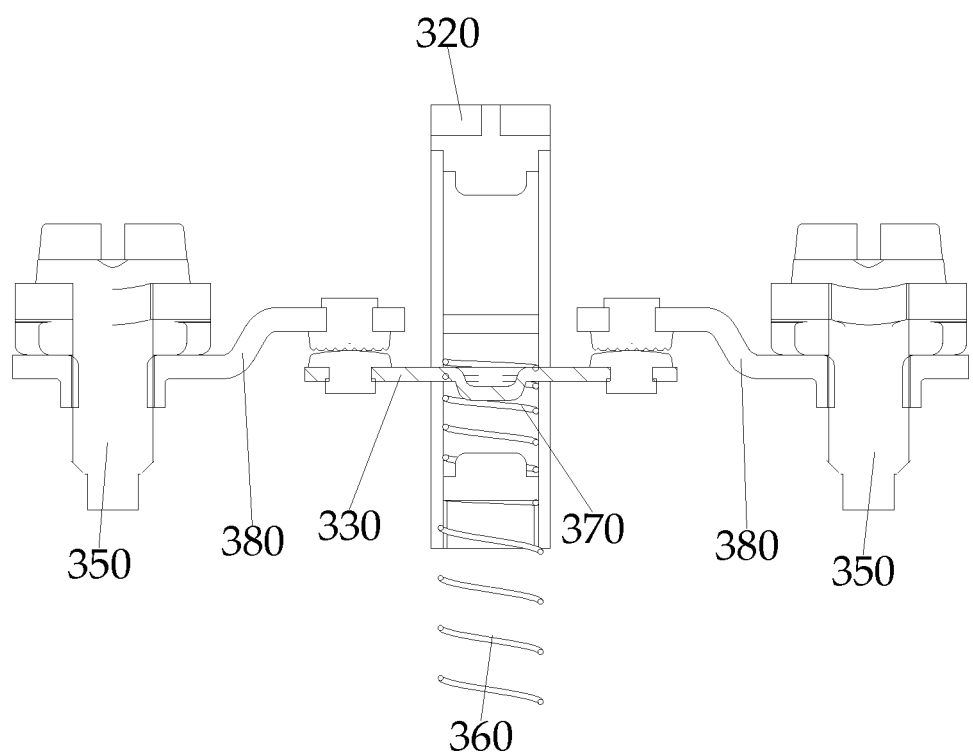
FIG. 9 is a schematic structural diagram of Embodiment 2 of the auxiliary contact mechanism of the present invention.

Referring to Embodiment 2 of the auxiliary contact mechanism shown in FIG. 9, the auxiliary contact mechanism in this embodiment is a normally-closed contact structure, which is different from Embodiment 1 in that: in Embodiment 1, the return spring 360 and the overtravel spring 370 are respectively located on the upper and lower sides of the movable contact bridge 330, and the two contact plates are located below the movable contact bridge 330; and in this embodiment, the return spring 360 and the overtravel spring 370 are both located below the movable contact bridge 330. In this embodiment, the two contact plates which are normally-closed contact plates 380 are located above the movable contact bridge 330, and the return spring 360 drives the movable contact bridge 330 to contact the two contact plates. When the main contact mechanism actuates, two ends of the movable contact bridge 330 are driven by the linkage member 310 to be separated from the two contact plates respectively, and other working principles are the same as those of Embodiment 1.

Figure 6:
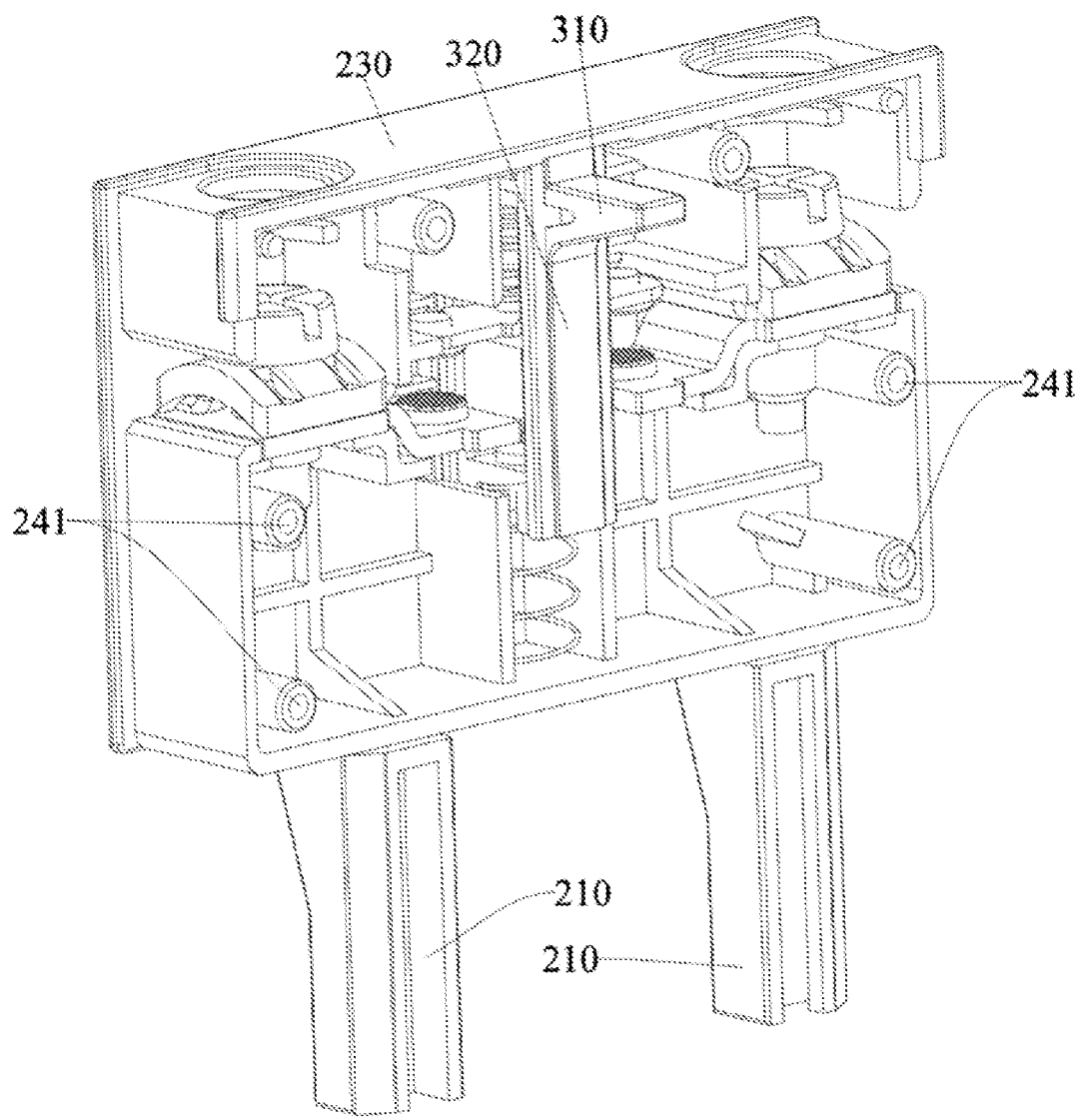
FIG. 6 is a schematic structural diagram of a base of the second housing according to an embodiment of the present invention.
Figure 7:
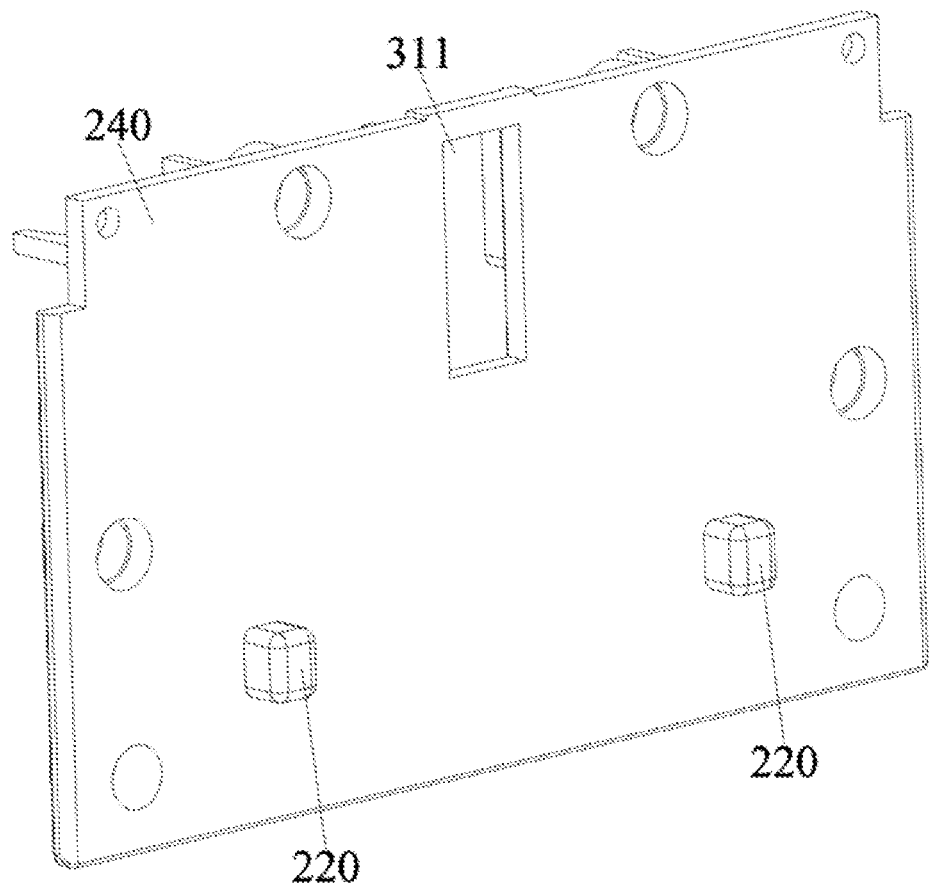
FIG. 7 is a schematic structural diagram of a cover plate of the second housing according to an embodiment of the present invention.
Figure 8:
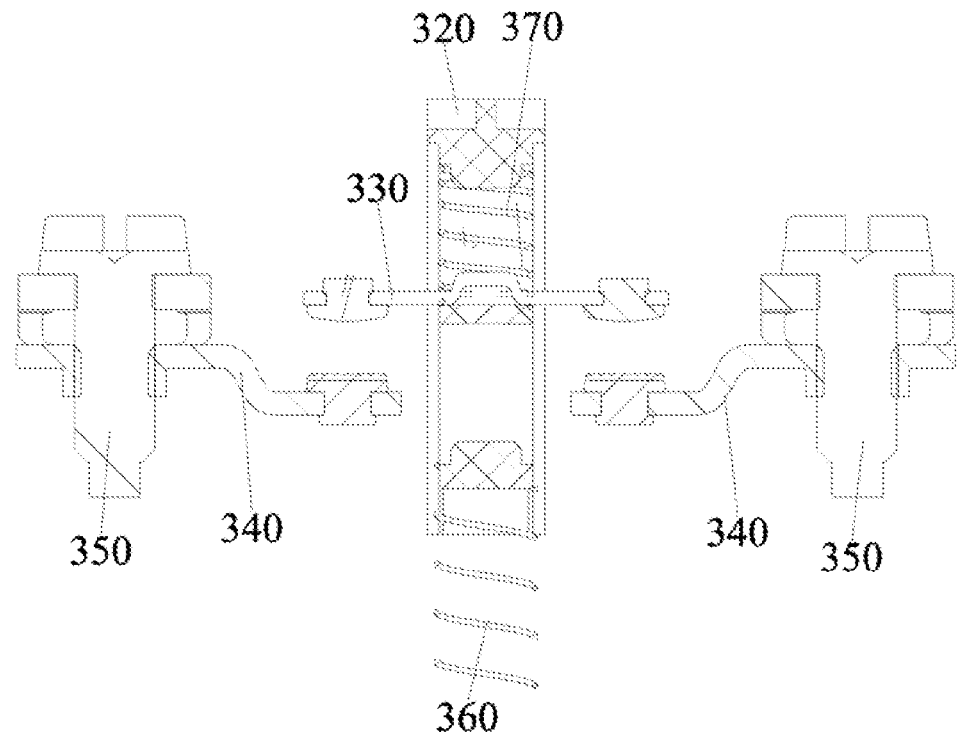
FIG. 8 is a schematic structural diagram of Embodiment 1 of an auxiliary contact mechanism of the present invention.

According to a preferred embodiment of the second housing 200 shown in FIGS. 6 to 7, the second housing 200 comprises a base 230 in a semi-box shape, and the base 230 is open toward one side of the first housing 100; a cover plate 240 is arranged at an opening of the base 230; the cover plate 240 is provided with a first through hole 311 and a positioning boss 220; the auxiliary contact mechanism is installed in the base 230; a connecting column 241 is arranged in the base 230 in a width direction; and the cover plate 240 is fixedly connected to the connecting column 241. Two parallel mounting legs 210 are arranged outside the bottom side wall of the base 230; the side wall of the lower housing 110 is provided with two second clamping grooves 111 which are respectively arranged opposite to the first clamping grooves 211 in the two mounting legs 210; and the two mounting legs 210 are respectively connected to the corresponding second clamping grooves 111 through the connector 400. Of course, the number of the mounting legs 210 may be one or more than three, as long as the number and position of the second clamping grooves 111 in the side wall of the lower housing 110 may correspond to those of the mounting legs 210. In addition, a plurality of first clamping grooves 211 may also be formed in one mounting leg 210, and a number of second clamping grooves 111 corresponding to the number of the first clamping grooves 211 may be formed in the side wall of the lower housing 110, all of which fall within the protection scope of the present invention.

As shown in FIG. 2, the mounting legs 210 are disposed on one end of the bottom side wall of the base 230 close to the first housing 100, and two supporting legs 212 which are respectively connected to the bottom side wall of the base 230 to a triangle are arranged on both sides of one end of the mounting leg 210 away from the first housing 100. The structural strength of the mounting legs 210 can be improved by the supporting legs 212. Of course, the supporting legs 212 can also have other shapes, which all fall within the protection scope of the present invention.

We have made further detailed description of the present invention mentioned above in combination with specific preferred embodiments, but it is not deemed that the specific embodiments of the present invention is only limited to these descriptions. A person skilled in the art can also, without departing from the concept of the present invention, make several simple deductions or substitutions, which all be deemed to fall within the protection scope of the present invention.

The invention claimed is:

1. A switching appliance, comprising a first housing and a second housing installed on one side of the first housing and used to accommodate an auxiliary contact mechanism, wherein the first housing comprises a lower housing, and an upper housing disposed on the top side of the lower housing and used to accommodate a main contact mechanism; the auxiliary contact mechanism comprises a linkage member connected to the main contact mechanism; the side wall of the second housing is provided with a first through hole used to make way for the linkage member; the side wall of the upper housing close to the second housing is provided with a second through hole corresponding to the main contact mechanism inside the upper housing; a mounting leg that extends to the side surface of the side wall of the lower housing is arranged at the bottom of the second housing; a first clamping groove is formed in the side surface, facing the lower housing, of the mounting leg, and a second clamping groove which is opposite to the first clamping groove are formed in the side wall of the lower housing; the mounting leg is connected to the side wall of the lower housing through a connector; the first clamping groove and the second clamping groove are in position-limiting cooperation with two sides of the connector, respectively; and the connector is simultaneously inserted into the first clamping groove and the second clamping groove in a direction perpendicular to the linkage member to fix the second housing and the first housing.

2. The switching appliance according to claim 1, wherein a positioning boss is arranged on the side wall outside the second housing; a positioning groove that cooperates with the positioning boss is formed in the side wall outside the first housing; and when the linkage member is inserted into the second through hole, the positioning boss is inserted into the positioning groove and then limited in position.

3. The switching appliance according to claim 1, wherein the connector is strip-shaped, and has a concave shape (a shape of Chinese character "凹") or H-shaped section.

4. The switching appliance according to claim 1, wherein, the connector is in a shaped of a Chinese character "凹", two limiting bars which are spaced from each other are arranged on the side surface of the connector; a limiting groove is formed between the two limiting bars; inner diameters of openings in the tops of the first clamping groove and the second clamping groove are respectively smaller than inner diameters of their respective bottoms; the first clamping groove and the second clamping groove are respectively communicated with the lower housing and the bottom of the mounting leg; when the connector is inserted into the first clamping groove and the second clamping groove from the bottom of the switching appliance, the two limiting bars slide along the bottoms of the first clamping groove and the second clamping groove respectively; and the openings in the top of the first clamping groove and the second clamping groove are respectively in position-limiting cooperation with the limiting groove.

5. The switching appliance according to claim 4, wherein each of the two limiting bars has a triangular cross-section; the two limiting bars are, on their one sides close to each other, provided with first pushing surfaces inclined to the bottom surface of the limiting groove respectively; the inner diameters of the first clamping groove and the second clamping groove gradually shrink from the bottom to the top opening respectively, such that the side walls of the first clamping groove and the second clamping groove form second pushing surfaces that are opposite to the first pushing surfaces.

6. The switching appliance according to claim 4, wherein a distance from the bottom of the limiting groove to the other side surface of the connector is smaller than the inner diameter of each of the top openings of the first clamping groove and the second clamping groove; a locking boss is arranged in the limiting groove; and the locking boss is in interference fit with the top openings of the first clamping groove and the second clamping groove respectively.

7. The switching appliance according to claim 4, wherein a distance from the bottom of the limiting groove to the other side surface of the connector is smaller than the inner diameter of each of the top openings of the first clamping groove and the second clamping groove; a buckling structure is respectively arranged on the two limiting bars; and clamping grooves that cooperate with the two buckling structures are respectively formed in the inner wall of the first clamping groove and the inner wall of the second clamping groove.

8. The switching appliance according to claim 1, wherein the second housing comprises a base in a semi-box shape, and the base is open toward one side of the first housing; a cover plate is arranged at an opening of the base; the cover plate is provided with a first through hole and a positioning boss; the auxiliary contact mechanism is installed in the base; a connecting column is arranged in the base in a width direction; and the cover plate is fixedly connected to the connecting column.

9. The switching appliance according to claim 8, wherein the mounting leg is arranged on one end of the bottom side wall of the base close to the first housing; two supporting legs which are respectively connected to the bottom side wall of the base to form a triangle are arranged on both sides of one end of the mounting leg away from the first housing; two parallel mounting legs are arranged outside the bottom side wall of the base; the side wall of the lower housing is provided with two second clamping grooves which are respectively arranged opposite to the first clamping grooves in the two mounting legs; and the two mounting legs are respectively connected to the corresponding second clamping grooves through the connector.

10. The switching appliance according to claim 1, wherein the auxiliary contact mechanism comprises a movable contact support, a movable contact bridge installed on the contact support, and two contact plates respectively arranged on both sides of the contact support; one ends of the two contact plates are respectively opposite to two ends of the movable contact bridge, and the other ends of the two contact plates are respectively provided with a wiring mechanism used to fix a wire; one side of the movable contact bridge away from each contact plate is connected to the contact support through an overtravel spring; one end of the contact support is connected to the second housing through a return spring; the side surface of the contact support is connected to the linkage member; and the linkage member is inserted into the first housing in a width direction and then connected to the main contact mechanism, so that the first clamping groove is aligned with the second clamping groove.

* * * * *